United States Patent Office 3,773,856
Patented Nov. 20, 1973

3,773,856
PROCESS FOR THE PREPARATION OF UNSATURATED EPOXY ESTER COMPOSITIONS
Eiichiro Takiyama, 17-7-201, 2-chome, Minami Kamata, Ota-ku, Tokyo, Japan, and Sadakazw Hokamura, 125-11 Aza Kaminohara, Kamiwada, Yamato-shi, Kanagawa-ken, Japan
No Drawing. Continuation-in-part of abandoned application Ser. No. 70,543, Sept. 8, 1970. This application Nov. 11, 1971, Ser. No. 197,935
Int. Cl. C08g 45/04
U.S. Cl. 260—836
8 Claims

ABSTRACT OF THE DISCLOSURE

A process for preparing an unsaturated epoxy ester resin composition which can be cured by the addition of an organic peroxide and an accelerator even at room temperature, said process comprising heat reacting an epoxy component selected from the epoxy compounds having at least one glycidyl ether type epoxy group in their molecular structure, with a first acid component from the group consisting of the polymerizable unsaturated monobasic acids of 2–8 carbon atoms and a second acid component selected from the group consisting of the saturated monobasic acids, saturated polybasic acids, saturated polybasic acid anhydrides, polymerizable unsaturated polybasic acids and polymerizable unsaturated polybasic acid anhydrides, in the presence of a polymerization inhibitor and an esterification catalyst in an atmosphere of air or molecular oxygen.

---

This is a continuation-in-part of applicants' copending application, Ser. No. 70,543, filed Sept. 8, 1970 now abandoned.

This invention relates to a process for preparing unsaturated epoxy ester compositions which can be cured even at room temperature.

In view of their possession of various good points, the epoxy resins are widely used for such purposes as coating material, adhesive, material for casting, reinforced plastics, etc. The epoxy resins form insoluble and infusible, three-dimensional cured products by the addition thereto of an acid substance such as organic acids or their anhydrides or a basic substance such as an amine. Numerous classes of hardeners are provided for the cure of epoxy resins, and hence it is well known that cured products of exceeding excellence can be obtained, if the hardener is decided in accordance with the properties required in the product. On the other hand, an error in the choice of the hardener results in the degradation of the properties of the cured product. Hence, great care must be exercised in the choice of the hardener.

Further, not only the choice of the hardener to use but the amount of its use must be right; or otherwise a degradation of the properties of the product will take place in most cases. In addition, the majority of the hardeners commonly in use require a prolonged period of time for curing the resin. Furthermore, since the hardener must generally be used in a prescribed amount, it is not possible to control the curing time indiscriminately by increasing or decreasing the amount of its use. Consequently, the curing temperature has been relied on for the control of the curing time. Further, if the cure is attempted at room temperature during those periods when the temperature falls below 10° C., as in winter, the cure cannot be accomplished adequately and in most cases the resulting cured product cannot demonstrate the properties that are intrinsically possessed by the epoxy resins. Furthermore, the amines are used as the hardener when curing at room temperature, but there is an aversion on the part of the users to such products on account of their toxicity. The foregoing drawbacks can possibly become the cause for hindering the development of the epoxy resins. Hence, the correction of these shortcomings is a desirable thing for the development of the epoxy resins.

On the other hand, while the unsaturated polyester resins have more shortcomings than the epoxy resins, their far greater excellence over the latter in respect of their curing properties and workability is recognized. That is to say, the unsaturated polyester resins can be cured under practically unrestricted conditions at either room temperature or under application of heat by the use of a small amount of an organic peroxide and, if necessary, a small amount of a polymerization accelerator.

In view of the hereinbefore given reasons, the combining of the curability and workability of the unsaturated polyester resins with the properties of the epoxy resins is conceivable as an ideal.

When an epoxy compound and a polymerizable unsaturated monobasic acid are reacted, an ester compound is formed, for example, in accordance with the following equation

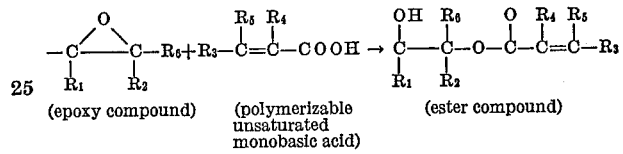

(epoxy compound)　(polymerizable unsaturated monobasic acid)　(ester compound)

wherein $R_1$, $R_2$, $R_3$, $R_4$, $R_5$ and $R_6$ are each hydrogen or alkyl. When the resulting ester compound is dissolved in a polymerizable monomer copolymerizable with the aforesaid polymerizable unsaturated monobasic acid (hereinafter may, at times, be referred to as merely monomer), a so-called unsaturated epoxy ester resin composition is obtained. However, when a resinous composition containing a polymerizable substance in its system, such as in this case, is heated for a prolonged period of time, gelation of the system frequently occurs, which is very dangerous.

It is therefore an object of the present invention to provide an unsaturated epoxy ester resin composition which measures up to the hereinbefore indicated ideal without possession of the foregoing defect.

Other objects and advantages of the invention will become apparent from the following description.

As a result of extensive researches, we found that an unsaturated epoxy ester resin composition which can be cured by the addition of an organic peroxide and an accelerator even at room temperature could be obtained and that the foregoing objects of the invention be achieved by heat reacting an epoxy component selected from the epoxy compounds having at least one glycidyl ether type epoxy group in their molecular structure, with a first acid component selected from the group consisting of the polymerizable unsaturated monobasic acids of 2–8 carbon atoms and a second acid component selected from the group consisting of the saturated monobasic acids, saturated polybasic acids, saturated polybasic acid anhydrides, polymerizable unsaturated polybasic acids and polymerizable unsaturated polybasic acid anhydrides, in the presence of a polymerization inhibitor and an esterification catalyst and, if necessary, a solvent or polymerizable monomer, in an atmosphere of air or molecular oxygen.

For obtaining resinous cured products possessing varying properties it was the usual practice in the prior art to vary the choice of the starting materials, i.e. the class of the epoxy compounds and/or polymerizable unsaturated monobasic acids used, or vary the reaction ratio of the two starting materials. On the other hand, according to the present invention described above, it is not only possible to vary the properties by varying the class of the epoxy compound, one of the starting materials, but also since the class of organic acids, the other starting materail, useable is multifarious, a still greater variation in the properties of the product can be expected by a suitable choice of the organic acid.

Further, in the past the adjustment of the degree of cross-linkage of the unsaturated epoxy ester resin depended on the amount used of the polymerizable unsaturated monobasic acid. Hence, when, for example, a low degree of cross-linkage was desired, i.e., when the amount used of the polymerizable unsaturated monobasic acid was small, the result was an excess of the epoxy group in the resinous composition. The cured product of a resinous composition containing a functional group such as this is inferior in its resistance to boiling as well as resistance to attack by chemicals. Now, in accordance with the present invention, an improvement of these drawbacks is also possible. When a saturated acid such as a saturated monobasic acid, a saturated polybasic acid or a saturated polybasic acid anhydride is used as an acid component along with a polymerizable unsaturated monobasic acid in accordance with a mode of operating the present invention in preparing the unsaturated epoxy ester resin composition by reacting an epoxy component with an acid component, the degree of cross-linkage can be optionally varied in accordance with the amount used of the foregoing saturated acid and thus, with the amount used of the polymerizable unsaturated monobasic acid being decreased, the foregoing drawbacks are eliminated.

In the esterification reaction of an epoxy component with an acid component, a rise generally takes place in the viscosity of the system as the reaction proceeds to make stirring impossible and invite the danger of gelation of the system. As a result, there are times when the reaction cannot be carried to completion. To solve this problem a procedure consisting of the use of an organic solvent as a viscosity reducing agent may be adopted, the addition of the organic solvent being made at an optional stage of the progress of the reaction thereby preventing a rise in the viscosity and make it possible to bring the reaction to completion without encountering any difficulty in carrying out the stirring of the system. However, if the reaction is carried out using a solvent, there is the trouble involved in removal of the solvent from the resin after completion of the reaction. Further, even though the solvent is removed, the possibility that some might remain behind in the resin to cause a decline of the properties of the resin is not absolutely nil. Again, when the reaction is to be carried out commercially, the additional step required for solvent removal is economically a disadvantage.

As hereinabove noted, the use of a solvent does make it possible to complete the esterification reaction, but for preventing the decline in the properties of the resulting resin and also for making the commercial production of the resin profitable, it is preferred to avoid the use of a solvent, if at all possible.

We also investigated into this matter also and, as a result, found that by carrying out the reaction in the presence of air or molecular oxygen and, if necessary, in the presence of a solvent or a polymerizable monomer it was possible to obtain by a safe operations resins possessing good properties. This was a truly surprising result when considered in view of generally accepted idea, as hereinbefore indicated, that there was the danger of gelation upon heating in the case of the presence of a polymerizable monomer.

According to the invention process, there is no necessity for removal of the solvent after the reaction, since the monomer becomes a component making up the resulting resin. The monomer may be added wholly at once or in increments either at the start of the reaction or optional stages during the progress of the reaction. When only a part of the monomer has been added at the start of the reaction or during the intermediate stages, the remainder can be added after completion of the reaction. In this case, the monomer added at the beginning and that added later may be the same or different.

Further, in conducting the esterification reaction of the epoxy component and the acid component on a commercial scale, a method wherein one of the components is first dissolved or mixed in the monomer and then the other component is added dropwise is convenient.

Monomers which can be used for practicing the invention include such as acrylic esters, methacrylic esters, vinyl benzene, vinyl toluene, acrylonitrile, vinyl acetate, diallyl phthalate and glycidyl methacrylate. These monomers can be used either singly or in combinations of two or more.

On the other hand, the epoxy compounds useable in the invention include those of the glycidyl ether type which have usually been synthesized from epichlorohydrin or methyl epichlorohydrin and a compound having a hydroxyl group. For example, mention can be made of such as the diglycidyl ether of 2,2-bis(4-hydroxyphenyl) propane, the polyglycidyl ethers obtained by reacting either epichlorohydrin or methyl epichlorohydrin with the so-called novolak obtained by the reaction of phenol and formaldehyde, triglycidyl ether of glycerine and tetraglycidyl ether of tetraphenylene ethane.

The polymerizable unsaturated monobasic acids used in the invention include such, for example, as acrylic acid, methacrylic acid and crotonic acid.

The polymerizable unsaturated polybasic acids and their anhydrides, which are useable in the invention, are exemplified by such as maleic acid, maleic anhydride, fumaric acid and itaconic acid.

On the other hand, the saturated polybasic acids and their anhydrides, which are useable in the invention, include such as phthalic anhydride, tetrahydrophthalic anhydride, hexahydrophthalic anhydride, succinic acid, adipic acid, trimellitic anhydride, pyromellitic anhydride, 1,4,5,6,7,7 - hexachlorobicyclo - [2,2,1]-5-heptene-2,3-dicarboxylic acid (Het Acid) and endomethylene tetrahydrophthalic anhydride. And as the saturated monobasic acids, mention can be made of such as benzoic acid and p-tert-butyl benzoic acid.

The reaction ratios of the first acid component and the second acid component to the epoxy component are such that the first acid component is present in a ratio of 1.10–2.05 moles, per mole of the epoxy component and the second acid component is present in a ratio of 0.05–0.45 moles per mole of the epoxy component. The reaction ratios are determined within the aforesaid limits depending upon the properties required of the cured resin products. When the amount of the acid components are less than the above ratios, it tends to give rise to insufficient room temperature curing. On the other hand, if the acid component ratios exceed the aforementioned limits, unreacted carboxyl groups are present in the final product, which tends to decrease the chemical resistance of the final products.

When the use of either a solvent or monomer is required, the amount used will vary depending upon the reactants, but at least one part per 100 parts of the esterified product is required.

The polymerzation inhibitors, which are usually used for promoting the safety of a reaction, such, for example, as hydroquinone, p-tert-butylcatechol, methoxyhydroquinone, copper salts and hydrazine salts may be conveniently used in the invention process. Again, the use in the invention process, as catalyst for the esterification reaction, of such compounds as boron trifluoride, chlorides of tin, lithium halides, paratoluenesulfonic acid, the amines such as tertiary amines, is of great advantage in carrying out the reaction.

For further illustration of the invention, the following non-limitative examples are given. The parts in the example are on a weight basis.

EXAMPLE I

A mixture consisting of 98 parts of maleic anhydride, 2000 parts of Epikote 828 (trade name of an epoxy resin produced by Shell Oil Company, U.S.A.), 687 parts of methacrylic acid, 11.3 parts of benzyldimethylamine and 0.01 part of hydroquinone was reacted by heating on an oil bath for 2 hours at 120° C. The acid value became practically zero. The resulting unsaturated ester resin was designated sample C. Thirty-five parts of styrene were added to 100 parts of sample C to yield a product having a viscosity at 25° C. of 7.8 poises and a color of Gardener 3-4. This latter product was designated sample A.

Separately, a mixture consisting of 860 parts of methacrylic acid, 2000 parts of Epikote 828 and 11.4 parts of benzyldimethylamine was heated on an oil bath for 2 hours at 120° C. To 100 parts of the so obtained unsaturated ester resin were added 30 parts of styrene and 0.01 part of hydroquinone. The so obtained product was designated sample B.

Samples A, B and C were cured by adding to each 0.5 part of benzoyl peroxide and 0.1 part of dimethylaniline. The results obtained are shown in the following table.

| Sample | Gelation time (min.) | Maximum temperature of heat generated (° C.) | Heat distortion temperature of cure resin (° C.) |
| --- | --- | --- | --- |
| A | 8 | 160 | 145 |
| B | 12 | 149 | 128 |
| C | 11 | 155 | 144 |

EXAMPLE II

A mixture consisting of 148 parts of phthalic anhydride, 1200 parts of Epikote 828, 290 parts of acrylic acid and 7 parts of benzyldimethylamine was heated for 1 hour and 40 minutes at 110-120° C. Since stirring became difficult in the latter stages of the reaction on account of a rise in the viscosity of the mixture, 200 parts of styrene and 0.4 part of hydroquinone were added and heating was continued for a further 40 minutes at 100° C. with stirring. The acid value declined to below 5. After completion of the reaction, 400 parts of styrene monomer were further added. The resulting resin had a color whose value was Gardener 3-4, and its viscosity at 25° C. was 15.3 poises.

When 100 parts of this resin was cost after incorporation of 1 part of benzoyl peroxide and 0.2 part of dimethylaniline, gelation took place in about 30 minutes and the cure was practically completed in 2 hours. The resulting cast product was not only hard but had elasticity as well. Its Rockwell hardness (M) was 114, Charpy impact value was 3-4 kg./cm.², and flexural strength was 11-13 kg./mm.².

EXAMPLE III

A mixture consisting of 2000 parts of Epikote 827 (trade name of an epoxy resin produced by Shell Oil Company, U.S.A.), 602 parts of methacrylic acid, 0.01 part of hydroquinone, 555 parts of Het Acid (trade name of 1,4,5,6,7,7 - hexachlorobicyclo-[2,2,1]-5-heptene-2,3-dicarboxylic acid produced by Hooker Chemical Company, U.S.A.) and 12.7 parts of benzyldimethylamine was heated for 2½ hours at 110-120° C. The acid value became practically zero. A considerable rise in the viscosity took place in the latter stages of the reaction. Hence, it would have been convenient to add a monomer or solvent in this case, but it was possible to carry out the operation without such an addition. After completion of the reaction, 1040 parts of styrene were added to the reaction product. The viscosity was 25 poises at 25° C. and the color was a value of Gardener 2-3. When 0.5 part of benzoyl peroxide and 0.1 part of dimethylaniline were added to 100 parts of the so obtained resin, it gelled in about 9 minutes and the maximum temperature of heat generated then was 146° C.

EXAMPLE IV

A mixture consisting of 350 parts of DEN 438 (trade name of epoxidized novolak produced by Dow Chemical Company, U.S.A.), 130 parts of methacrylic acid, 72 parts of p-tert-butyl benzoic acid and 2 parts of benzyldimethylamine was heated for 3 hours at 110-120° C. The acid value declined to below 10. 250 parts of styrene and 0.15 part of hydroquinone were added to the reaction mixture in the latter stages of the reaction, after which the reaction mixture was held at 100° C. for 20-30 minutes and then cooled. The color of the product becomes a value of Gardener 5. When 100 parts of the so obtained resin were heated at 82° C. after addition thereto of one part of benzoyl peroxide, gelation took place in 4 minutes and 40 seconds. The maximum temperature of heat generated then was 212° C. The Rockwell hardness of the so obtained cured product was 114-115 or the M scale.

We claim:

1. A process for preparing an unsaturated epoxy ester resin composition which can be cured by the addition of an organic peroxide and an accelerator even at room temperature, said process comprising heat reacting one mol of an epoxy component selected from epoxy compounds having at least two glycidyl ether type epoxy groups in their molecular structure, with 1.10 to 2.05 mols of a first acid component selected from the group consisting of polymerizable unsaturated monobasic acids of 2-8 carbon atoms and 0.05 to 0.45 mol of a second acid component selected from the group consisting of saturated monobasic acids, saturated polybasic acids, saturated polybasic acid anhydrides, polymerizable unsaturated polybasic acids and polymerizable unsaturated polybasic acid anhydrides, in the presence of a polymerization inhibitor, an esterification catalyst and at least one part of an ethylenically unsaturated polymerizable monomer per 100 parts of the esterified product, in an atmosphere of air or molecular oxygen.

2. The process according to claim 1 wherein said first acid component is acrylic acid.

3. The process according to claim 1 wherein said first acid component is methacrylic acid.

4. The process according to claim 1 wherein said second acid component is p-tert-butyl benzoic acid.

5. The process according to claim 1 wherein said second acid component is phthalic anhydride.

6. The process according to claim 1 wherein said second acid component is 1,4,5,6,7,7-hexachlorobicyclo-[2,2,1]-5-heptene-2,3-dicarboxylic acid.

7. The process according to claim 1 wherein said second acid component is maleic anhydride.

8. The process according to claim 1 wherein said polymerizable monomer is styrene.

References Cited

UNITED STATES PATENTS

| | | | |
| --- | --- | --- | --- |
| 3,256,226 | 6/1966 | Fekete | 260—837 |
| 2,824,851 | 2/1958 | Hall | 260—837 |
| 2,970,983 | 2/1961 | Newey | 260—78.4 |
| 3,066,112 | 11/1962 | Bowen | 260—41 |

PAUL LIEBERMAN, Primary Examiner

U.S. Cl. X.R.

260—47 EC, 78.4 Ep, 837 R